Aug. 2, 1927.
E. W LIPSCHUTZ
1,637,421
PRESSURE INDICATOR
Filed June 23, 1926
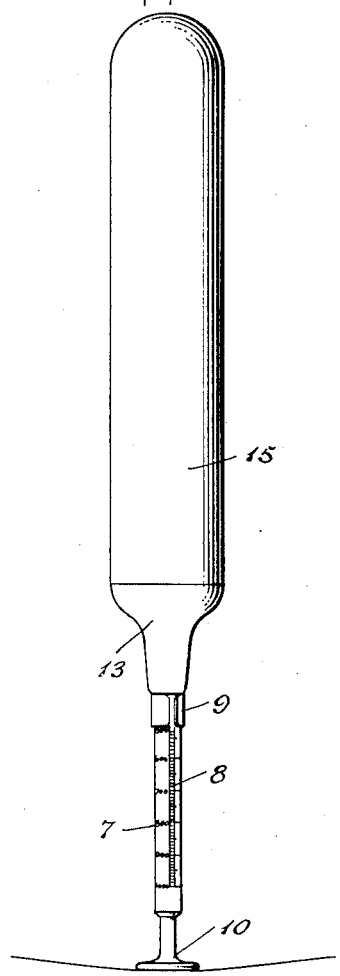
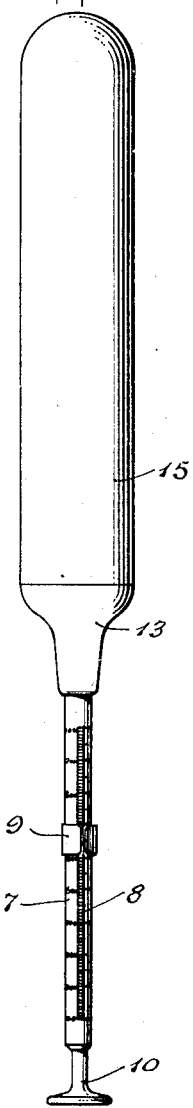
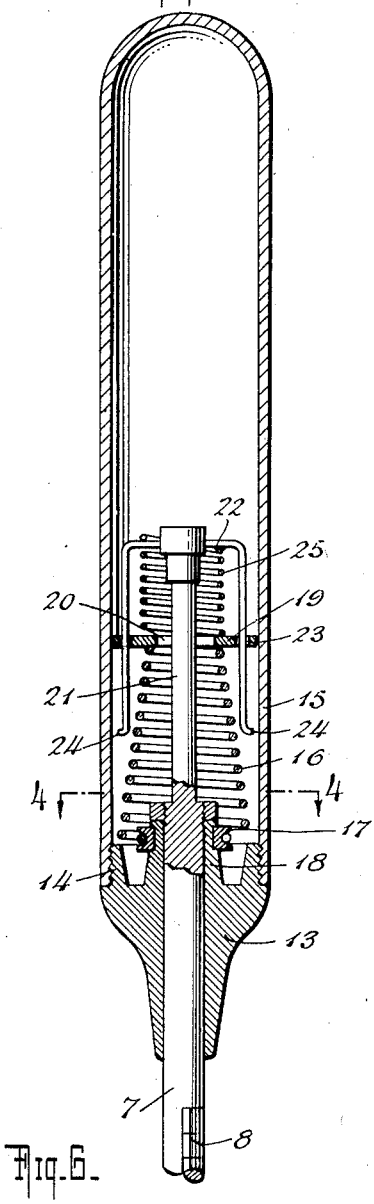
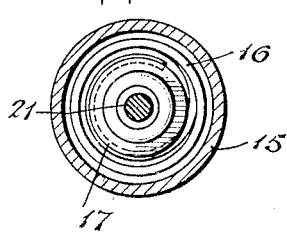
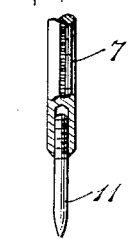
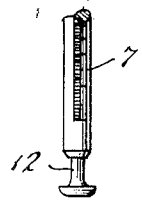
INVENTOR
EMANUEL W. LIPSCHUTZ
BY
ATTORNEYS Patented Aug. 2, 1927.

1,637,421

UNITED STATES PATENT OFFICE.

EMANUEL WM. LIPSCHUTZ, OF BROOKLYN, NEW YORK.

PRESSURE INDICATOR.

Application filed June 23, 1926. Serial No. 117,910.

This invention relates generally to improvements in medical instruments, and has particular reference to a pressure indicator used as an aid in determining the condition of diseased areas of the anatomy.

An object of the invention is to provide an indicator of an improved type which is utilized to apply pressure to diseased areas and record the amount of pressure necessary to cause a person being treated to experience a sensitiveness to any pain produced by reason of such pressure, thus assisting the surgeon or physician in determining the condition of such diseased areas.
Another object is to utilize the movement of one part of the indicator relative to the graduated stem thereof, when applying pressure to said part, to operate an indicating device which will indicate on said stem the amount of applied pressure.

The above and other objects will appear more clearly from the following detail description, when taken in connection with the accompanying drawing, which illustrates preferred embodiments of the inventive idea.

In the drawing—

Figure 1 is a side elevation of the indicator with the parts in operative position after pressure has been applied;

Figure 2 is a similar view showing the position of the parts after the indicator has been moved from engagement with an area being tested;
Figure 3 is an enlarged fragmentary longitudinal section through the indicator;

Figure 4 is a transverse section on the line 4—4 of Figure 3; and

Figures 5 and 6 are fragmentary views showing different types of contact devices which may be employed in connection with the indicator.

The device of the present invention may be used in determining the condition of a patient suffering from diseases such as neuritis, arthritis, myositis, various rheumatic local manifestations, infections of the mastoids, various eye diseases (glaucoma), sinusitis, various neurological diseases, and others.

As shown in its preferred form the indicator consists of a stem 7 having a scale 8 upon its outer end graduated in terms of grams. An indicating device 9 in the form of a collar or its equivalent is movable over the graduations in a manner which will appear in the course of the description to indicate the amount of pressure applied to the indicator when used in determining the condition of a diseased area. The outer extremity of the stem 7 has detachably secured thereto by screw threads or otherwise a contact member 10 which is adapted to be engaged with the surface of a diseased area, as shown in Figure 1, preparatory to applying pressure to the device. This contact member 10 may assume different forms, as indicated, for instance, in Figures 5 and 6, the contact 11, shown in Figure 5, being more or less pointed while the member 12, shown in Figure 6, is provided with a head of different configuration from the head of member 10. Other shapes of contact members may also be provided and, having screw threaded shanks, may be interchangeably connected to the outer end of the stem 7 of the indicator. These different shapes of contact member may be used when testing the condition of different diseases in various parts of the anatomy and in accordance with the sensitiveness of the area to be tested, it being understood generally that a contact member, such as shown in Figure 5, will produce a sensation of pain, when pressure is applied to the indicator, at a lesser pressure than a device provided with a large or small head, such as the members 10 and 12.

A sleeve member 13 having an outer reduced end is slidably mounted upon the stem 7 and movable over the scale 8. The enlarged portion of said sleeve member is provided with an externally threaded annular flange 14 adjacent its periphery which is adapted to be engaged by the internal threads of the open end of a casing 15. This casing is of tubular form and provides a handle by means of which the indicator may be placed in operative position and pressure applied to the sleeve member 13 to move the same longitudinally of the stem and toward its outer end. Preparatory to doing this, however, the indicating device 9 is moved inwardly so that it will contact the reduced end of the sleeve member 13 and thus be moved therewith over the scale 8. When a patient becomes sensitive to pain, by reason of the pressure applied to the area being tested, this pressure is at once relieved by the person handling the indicator whereupon the sleeve member 13 and the stem again assume their relative normal positions with the stem projected outwardly, this being accomplished in a manner which will presently appear. Upon the parts thus assuming their normal positions the indicating device 9 remains in its actuated position upon the stem, as shown in Figure 2, thus recording the amount of pressure, in grams, which was applied to the diseased area. Repetitions of this operation from time to time will indicate to the surgeon or physician the progress of the diseased part. Thus, if upon the first test a patient was sensitive to pain when a very slight pressure was applied to the device and in a subsequent test the physician was enabled to apply a greater pressure before pain was felt, this would indicate an improvement in the condition of the diseased area. It will be understood, of course, that the indicating device 9 may be dispensed with, in which event the reduced end of the sleeve member 13, which is movable over the scale 8, would be employed in taking a reading. However, if the indicating device 9 is not used the reading would have to be taken before pressure is relieved upon the handle 15.

Means are provided for offering resistance to the pressure upon the handle 15 and consequently the member 13 in order to secure the proper readings upon the scale 8 and this means is of such nature that the resistance offered increases in accordance with the amount of pressure applied. Said means, in its preferred form, consists of a coil spring 16 one end of which is fastened, by soldering or otherwise, to a ring 17 secured upon a central boss 18 formed upon the inner end of the member 13. The opposite end of said spring is secured to a guide disk 19 having a central opening 20 through which projects the inner reduced end 21 of the stem 7, said disk or plate 19 being of such diameter that the same will be capable of longitudinal movement relative to the handle or casing 15. The inner extremity of the end 21 of the stem has secured thereto in any preferred manner the central or bight portion of a wire yoke 22 of U-shaped formation, the sides of which extend through diametrically opposed openings 23 provided in the disk 19. The free extremities of the yoke 22 are bent, as indicated at 24, so as to form stops which will limit the relative movement of the disk 19 with respect to the yoke when pressure is applied to the handle 15.

A second coil spring 25, smaller than the spring 16 and having less tension than the latter spring, is interposed between and secured to the disk 19 and central portion of the yoke 22. This spring 25, by reason of its connection with the yoke 22 which is secured to the inner end of the stem, will offer the initial resistance to the pressure applied to the handle 15 and will expand, by reason of the movement of said handle and the member 13, outwardly along the stem 7. As the member 13 moves outwardly a pull is exerted upon the disk 19, due to the connection of the spring 16 therewith, which pull will move said disk along the side members of the yoke 22 until the disk contacts with the bent ends 24. The movement of the disk 19 relative to the yoke now being stopped by the ends 24, any further outward pressure upon the sleeve member 13 will be against the tension of the larger spring 16 and as said spring is expanded its tension will be increased with the increase in pressure upon the sleeve member. During the outward movement of the sleeve member 85 the indicating device 9 is engaged thereby and also moved along the graduated scale. At the proper moment, that is, when the patient is sensitive of pain in the area being tested, the device is removed from contact with the body of the patient whereupon the springs 16 and 25 will contract and thus restore the parts to the normal position shown in Figure 3, leaving the indicating device 9 at the position to which it has been moved by the movement of the member 13. A reading of the amount of pressure exerted upon the device during the test may now be taken and recorded for comparison with previous or subsequent readings.

What is claimed is:

1. In a pressure indicator, a graduated stem having one end capable of engagement with various areas of the anatomy to test the sensitiveness to pressure upon said areas, a sleeve member operated by pressure to move along said stem, a coil spring having one end connected to said sleeve member, a guide member secured to the other end of said spring, a yoke secured to said stem and extending through said guide member for movement relative thereto, said yoke having means to engage said guide member to also cause a unitary movement of the yoke and member, and a second spring interposed between and secured to said guide member and said yoke, the initial pressure upon said sleeve member causing a movement of said yoke and said second spring relative to said guide member, and subsequent pressure upon said sleeve member expanding the first named spring and moving said yoke and guide member in unison.

2. In a pressure indicator, a graduated stem having one end capable of engagement with various areas of the anatomy to test the sensitiveness to pressure upon said areas, a sleeve member operated by pressure to move along said stem, a coil spring having one end connected to said sleeve member, a yoke secured to said stem and having portions thereof extending through said guide member for movement relative thereto, the extremities of said portions being bent to provide stops engageable with said guide member to cause the latter to move with said yoke at the termination of the relative movement between said elements, and a second spring of greater tension than the first named spring interposed between and secured to said guide member and said yoke.

In testimony whereof I have affixed my signature.

EMANUEL WM. LIPSCHUTZ.